United States Patent
Subramonian et al.

(12)

(10) Patent No.: US 6,701,362 B1
(45) Date of Patent: Mar. 2, 2004

(54) METHOD FOR CREATING USER PROFILES

(75) Inventors: Ramesh Subramonian, Palo Alto, CA (US); Ramana Venkata, Mountain View, CA (US); Pangal P. Nayak, Palo Alto, CA (US); Joy A. Thomas, Sunnyvale, CA (US)

(73) Assignee: PurpleYogi.com Inc., Mountain View, CA (US)

( * ) Notice: Subject to any disclaimer, the term of this patent is extended or adjusted under 35 U.S.C. 154(b) by 0 days.

(21) Appl. No.: 09/510,902

(22) Filed: Feb. 23, 2000

(51) Int. Cl.[7] .................. G06F 15/173; G06F 15/16; G06F 12/14
(52) U.S. Cl. .................. 709/224; 709/228; 713/200
(58) Field of Search .................. 709/224, 218, 709/227, 228, 203, 229; 707/2, 3, 10; 345/745; 705/10, 14; 713/200

(56) References Cited

U.S. PATENT DOCUMENTS

| | | | |
|---|---|---|---|
| 5,446,891 A | 8/1995 | Kaplan et al. | |
| 5,727,129 A | 3/1998 | Barrett et al. | |
| 5,754,939 A | 5/1998 | Herz et al. | |
| 5,796,952 A | 8/1998 | Davis et al. | |
| 5,848,396 A | 12/1998 | Gerace | |
| 5,933,827 A | 8/1999 | Cole et al. | |
| 5,991,735 A | 11/1999 | Gerace | |
| 6,018,619 A | * 1/2000 | Allard et al. | 709/224 |
| 6,138,155 A | * 10/2000 | Davis et al. | 709/224 |
| 6,169,997 B1 | * 1/2001 | Papierniak et al. | 715/501.1 |
| 6,253,202 B1 | * 6/2001 | Gilmour | 707/9 |
| 6,334,110 B1 | * 12/2001 | Walter et al. | 705/14 |
| 6,377,983 B1 | * 4/2002 | Cohen et al. | 709/217 |
| 6,381,632 B1 | * 4/2002 | Lowell | 709/203 |
| 6,385,619 B1 | * 5/2002 | Eichstaedt et al. | 707/104.1 |
| 6,438,579 B1 | * 8/2002 | Hosken | 709/203 |
| 6,457,010 B1 | * 9/2002 | Eldering et al. | 707/10 |
| 6,581,072 B1 | * 6/2003 | Mathur et al. | 707/104.1 |

FOREIGN PATENT DOCUMENTS

GB      2335761 A  *  9/1999  ........... G06F/17/30

OTHER PUBLICATIONS

Shahabi, C. et al., "Knowledge discovery from users Web–page navigation", IEEE International Workshop on Research Issues in Data Engineering, ISBN: 0–8186–7849–6, pp. 20–29, Apr. 1997.*

Hau, C.C. et al., "Constructing personal digital library by multi–search and customized category", IEEE International Conference on Tools with Artificial Intelligence, ISBN: 0–7803–5214–9, pp. 148–155, Nov. 1998.*

Tu, H.C. et al., "Agetn Technology for website browsing and navigation", IEEE International Conference on Systems Sciences, ISBN: 0–7695–0001–3, pp. 2–11, Jan. 1999.*

Ignatius, David, "Tools for Detecting Terror", www.washingtonpost.com, p. A37, pp. 1–3, Oct. 2002.*

* cited by examiner

Primary Examiner—Jason D. Cardone
(74) Attorney, Agent, or Firm—Townsend and Townsend and Crew LLP

(57) ABSTRACT

A method for creating personalized user profiles using a client computer. A client computer executes a method which monitors user activities and collects content and context information based on the monitored user activities. The client computer processes the content and context information to determine concepts of interest to the user and the user's level of interest in the concepts. Information related to the concepts and the user's interest level associated with the concepts is used to create a personalized profile for the user on the client computer.

17 Claims, 6 Drawing Sheets

METHOD FOR CREATING USER PROFILES

The disclosure of each application listed below is hereby incorporated by reference in its entirety into the present application for all purposes.

U.S. Provisional Patent Application No. 60/184,391, entitled "METHOD FOR AUTOMATICALLY ARCHIVING INFORMATION OF WEB PAGES AT A CLIENT LOCATION" filed concurrently with the present application;

U.S. patent application No. 09/511,034, entitled "SYSTEM FOR CREATING USER PROFILES", now abandoned, filed concurrently with the present application; and U.S. patent application No. 09/510,904, entitled "COMPUTER PROGRAM FOR CREATING USER PROFILES", now abandoned, filed concurrently with the present application.

BACKGROUND OF THE INVENTION

The present invention relates generally to using communication and information networks. More particularly, the present invention provides methods for creating personalized profiles for users on a client computer based on the user's activities.

Usage of communication networks, such as the Internet, has increased exponentially in recent years. Users of the Internet perform a broad variety of activities ranging from activities for accessing information such as news, weather information, sports related information, stocks information, etc., to performing electronic commerce (e-commerce) related activities such as buying or selling goods/services, and other similar activities.

Computer systems connected to the Internet are classified as "clients" or "servers" depending on the role the computer systems play with respect to requesting information or providing information. Client computers typically request information from a server computer which provides the information. Server systems are typically responsible for receiving information requests from client systems, performing processing required to satisfy the requests, and for forwarding the results corresponding to the information requests back to the requesting client systems. The processing required to satisfy the client request may be performed by a single server or may alternatively be delegated to other servers connected to the communication network, such as the Internet.

The World Wide Web (the "Web") enables users of the Internet to conveniently access resources offered by the Internet. In the Web environment, information resources are typically stored in the form of hypertext documents called "web pages" which can be accessed and read by users of the Web. A web page may incorporate any combination of text, graphics, audio and video content, software programs, and other data. Web pages may also contain hypertext links to other web pages. Web pages are typically stored on web servers coupled to the Internet. Each web page is uniquely identified by an address called a Uniform Resource Locator (URL) that enables users to access the web page.

Users typically access web pages using a program called a "web browser" which executes on a client computer coupled to the Internet. The web browser is a type of client application that enables users to select, retrieve, and perceive resources on the Web. In particular, web browsers allow users to access and view web pages on a computer monitor. Examples of browsers include the Microsoft® Internet Explorer browser program provided by Microsoft® Corporation, and the Netscape® Navigator browser provided by Netscape® Corporation, and others. Users access web pages by providing URL information to the browser, either directly or indirectly, and the browser responds by retrieving the corresponding requested web page from the Internet. The retrieved web page may then be displayed on the client computer.

Due to the rapid increase in the number of web pages accessible via the Internet, it is becoming increasingly difficult for users to locate web pages which are relevant or of interest to the users. In order to find relevant web pages, a user is often forced to sift through large volumes of information and web pages, most of which are irrelevant to the user. Consequently, accessing web pages can often be a time consuming activity.

Several techniques have been developed to reduce the time that a user has to spend in accessing web pages or information of interest to the user. According to one technique, web pages are classified into subject categories which are displayed to the user as hypertext or URL links. Upon selection of a particular subject category, a list of web page links classified under the subject category are displayed to the user. Such a technique is used by Yahoo™ which organizes information available over the web into categories such as "News & Media," "Recreation & Sports," "Entertainment," etc. While this technique provides some organization of information/web pages available via the Internet, the subject categories are usually not sufficient to locate information of interest to the user. Since each subject category typically includes a large number of web pages, another search within the subject category is typically necessitated to locate web pages of interest to the user. Additionally, the subject categories are static and thus cannot be customized for a particular user's specific needs.

Other techniques allow users to build personal web pages and to customize the contents of the web pages. Such a technique is used by Yahoo™ for their My Yahoo™ service. While this technique is an improvement over the "subject category" techniques described above, it has a drawback in that it presumes that the user has prior knowledge of web pages which are of interest to the user. Web pages which may have been of interest to the user, if known by the user, cannot be facilitated by this technique. Further, information regarding the contents of a personalized user web page is usually stored on a web server remote from the user's client computer. This raises several security concerns for the user since the user has very little control over the collection and dissemination of the personalized information.

More sophisticated techniques facilitate a user's web activities by collecting information about the user, either explicitly or implicitly. These techniques are typically associated with a particular website, and monitor and record a user's interactions with web pages hosted by the website. Explicit information collection techniques typically solicit information from the user via web-based forms, questionnaires, surveys, opinion polls, and the like. Conventional implicit information collection techniques typically collect information using "cookies" or other inferential tracking programs. These implicit techniques are able to collect user related information without any effort or attention from the user.

In the context of the Internet and the WWW, a "cookie" generally refers to a block of data that a web server stores on a client computer. The cookie is a block of data which is configured by the server (typically a web server) to monitor and record information related to a user's activities associated with one or more web pages hosted by the web server. The user related information typically includes information about selections, purchases, etc. made by the user at web pages hosted by the web server. The information stored by a cookie is generally accessed and used by the server when the particular server or web page is accessed again by the client computer. Cookies may be used by web servers to identify users, to instruct the server to send a customized version of the requested web page to the client computer, to submit account information for the user, and the like. Explicit and implicit user information collection techniques are used by a large number of web-based providers of goods and services including Amazon™, DoubleClick™, and the like. In some instances, the user information gathered by the servers is used to create customized profiles for the users which are stored on the web servers. The customized profiles generally summarize the user's activities at one or more web pages associated with the servers.

A major drawback of conventional user related information gathering techniques is that the user has very little control on the information gathering process. This is because the information is usually gathered without the user's permission by processes resident on web servers which are typically remote from the client computer used by the user. The user typically has no control either on the contents of the collected information or on when the information is collected. This lack of control raises several security concerns for the user.

Thus, there is a need for a method which facilitates collection of user related information while minimizing the problems associated with conventional techniques. It is further desired that the user have complete control over the collection and dissemination of the information.

SUMMARY OF THE INVENTION

The present invention provides methods for creating personalized user profiles on a client computer based on user activities associated with the client computer, and other user specific information accessible to the client computer. According to an embodiment, the present invention monitors user activities at a client computer, the user activities including user interactions with a browser program executing on the client computer. User information, including content and context information, is then collected based on the monitored user activities. The client computer then processes the user information to generate a personalized profile for the user which is stored on the client computer. User profiles are thus created locally on a client computer without any remote server intervention.

According to an embodiment, the present invention provides methods which are executed by the client computer and which determine a plurality of concepts from the collected user information. For each concept, the client computer determines the user's level of interest in the concept. A value quantifying the user's level of interest is then associated with each concept. Personalized user profiles are then generated based on the concept information and values associated with the concepts.

According to an embodiment of the present invention, the user interactions with the browser program which are monitored by the present invention include web browsing activities, search activities using the browser program, electronic commerce transaction activities, electronic mail related activities, financial activities performed by the user using the browser program, interactive activities performed by the user using the browser program, and the like.

According to an embodiment of the present invention, content information collected by the present invention may include contents of web pages accessed by the user using the browser, URL information for the web pages accessed by the user, title information of the web pages accessed by the user, information on searches performed by the user using the browser program, information on transactions performed by the user using the browser program, information input by the user to the browser program, information related to links on web pages accessed by the user, and the other like information.

According to an embodiment of the present invention, context information collected by the client computer includes information related to date and time when the user performed the user interactions with the browser program or when the user accessed web pages via the browser program, information related to amount of time spent by the user viewing the web pages accessed via the browser program, information on servers hosting the web pages accessed by the user, information regarding order in which the user accessed the web pages, and the like.

According to an embodiment of the present invention, only user-permitted activities are monitored, and only user-permitted information is collected. The user interactions monitored by the client computer may include the user's interactions with other external devices which are capable of exchanging information with the client computer. The present invention also monitors user's interactions with various application executing on the client computer.

The foregoing, together with other features, embodiments, and advantages of the present invention, will become more apparent when referring to the following specification, claims, and accompanying drawings.

DESCRIPTION OF THE SPECIFIC EMBODIMENTS

Figure 1:
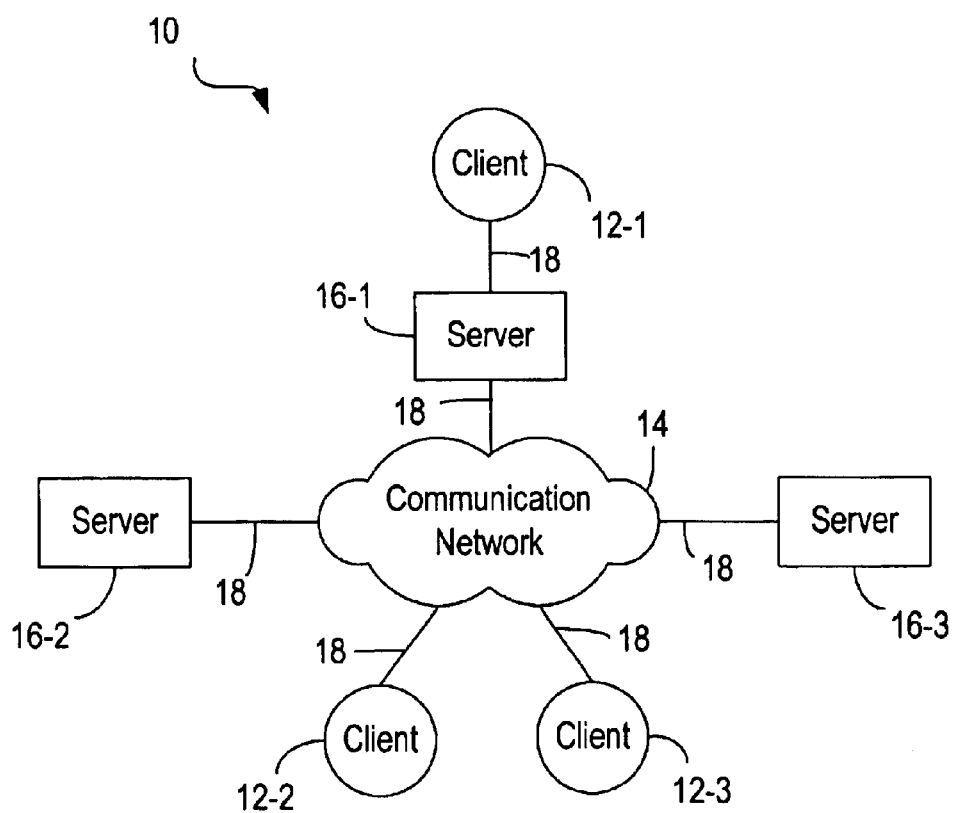
FIG. 1 is a simplified block diagram of a distributed computer network which may incorporate an embodiment of the present invention.

FIG. 1 is a simplified block diagram of a distributed computer network 10 which may incorporate an embodiment of the present invention. As shown, computer network 10 includes a plurality of client computer systems 12-1, 12-2, and 12-3, and several server computer systems 16-1, 16-2, and 16-3 coupled to communication network 14 via communication links 18. Communication network 14 provides a mechanism allowing the various components of computer network 10 to communicate and exchange information with each other. Communication network 14 may itself be comprised of many interconnected computer systems and communication links. Communication links 18 may be hardwire links, optical links, satellite or other wireless communications links, wave propagation links, or any other mechanisms for communication of information. While in one embodiment, communication network 14 is the Internet, in other embodiments, communication network 14 may be any suitable computer network. Distributed computer network 10 depicted in FIG. 1 is merely illustrative of an embodiment incorporating the present invention and does not limit the scope of the invention as recited in the claims. One of ordinary skill in the art would recognize other variations, modifications, and alternatives.

Client computers 12 allows users, both human and machine, to access web pages and other resources provided by servers 16 coupled to communication network 14. As shown in FIG. 1, client computer systems 12 may be connected directly with communication network 14, such as computer systems 12-2, and 12-3, or may alternatively be connected to communication network 14 via a larger server computer system, such as client computer system 12-1.

Figure 2:
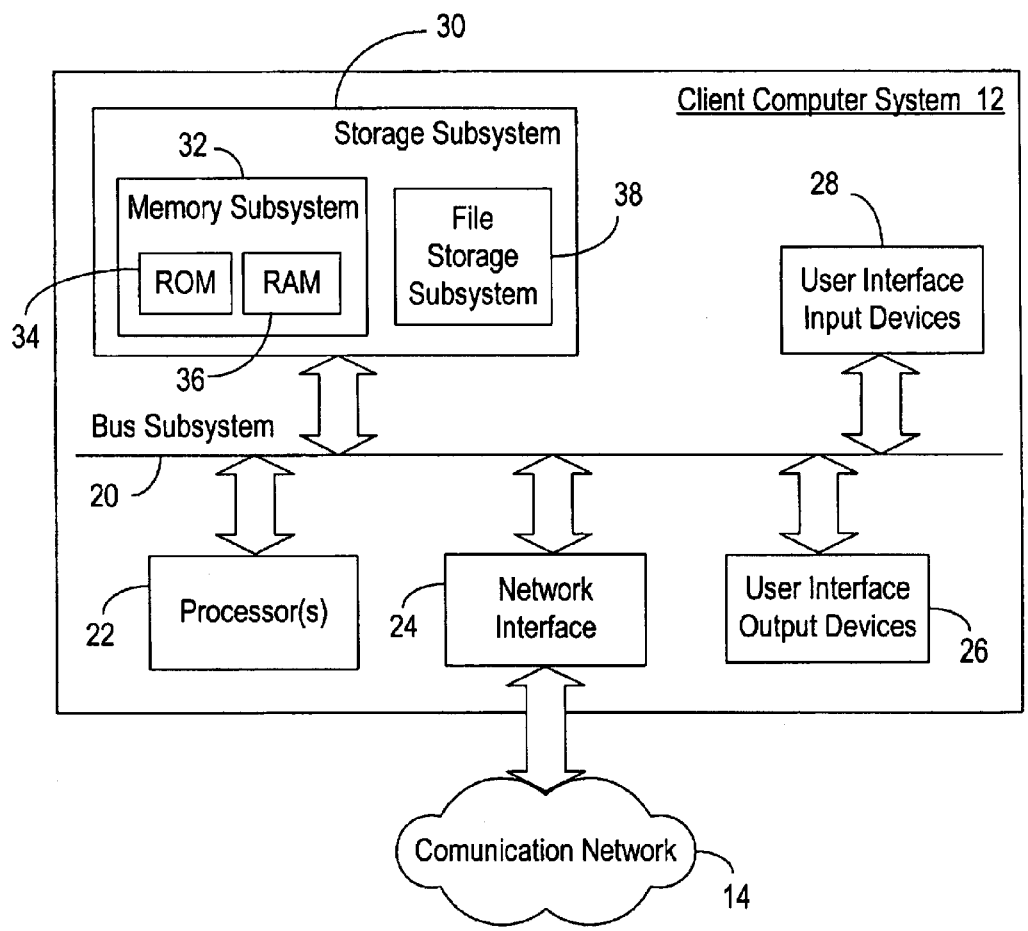
FIG. 2 is a simplified block diagram of a client computer system which may incorporate an embodiment of the present invention.

FIG. 2 is a simplified block diagram of a client computer system 12 according to an embodiment of the present invention. Client system 12 typically includes at least one processor 22 which communicates with a number of peripheral devices via bus subsystem 20. These peripheral devices may include a storage subsystem 30, comprising a memory subsystem 32 and a file storage subsystem 38, user interface input devices 28, user interface output devices 26, and a network interface subsystem 24. The input and output devices allow user interaction with client system 12. Network interface subsystem 24 provides an interface to outside networks, including an interface to communication network 14, and is coupled via communication network 14 to corresponding interface devices in other client and server computer systems.

User interface input devices 28 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into client computer system 12 or onto computer network 14.

User interface output devices 26 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from client computer system 12 to the user or to another machine or computer system.

Storage subsystem 30 stores the basic programming and data constructs that provide the functionality of the present invention. For example, the various modules implementing the functionality of the present invention and the browser application may be stored in storage subsystem 30. These software modules are generally executed by processor 22.

Memory subsystem 32 typically includes a number of memories including a main random access memory (RAM) 36 for storage of instructions and data during program execution and a read only memory (ROM) 34 in which fixed instructions are stored. File storage subsystem 38 provides persistent (non-volatile) storage for program and data files, and may include a hard disk drive, a floppy disk drive along with associated removable media, a Compact Digital read Only Memory (CD-ROM) drive, an optical drive, or removable media cartridges. The databases and modules implementing the functionality of the present invention may be stored by file storage subsystem 38.

Bus subsystem 20 provides a mechanism for letting the various components and subsystems of client computer system 12 communicate with each other as intended. Although bus subsystem 20 is shown schematically as a single bus, alternate embodiments of the bus subsystem may utilize multiple busses.

Client computer system 12 itself can be of varying types including a personal computer, a portable computer, a workstation, a computer terminal, a network computer, a television, a mainframe, or any other data processing system or user device. Due to the ever-changing nature of computers and networks, the description of client computer system 12 depicted in FIG. 2 is intended only as a specific example for purposes of illustrating the preferred embodiment of the present invention. Many other configurations of client system 12 are possible having more or less components than the computer system depicted in FIG. 2. Servers 16 coupled to communication network 14 may generally have the same configuration as client system 12 depicted in FIG. 2., although the server systems 16 typically have more storage capacity and computing power than the client systems.

Figure 3:
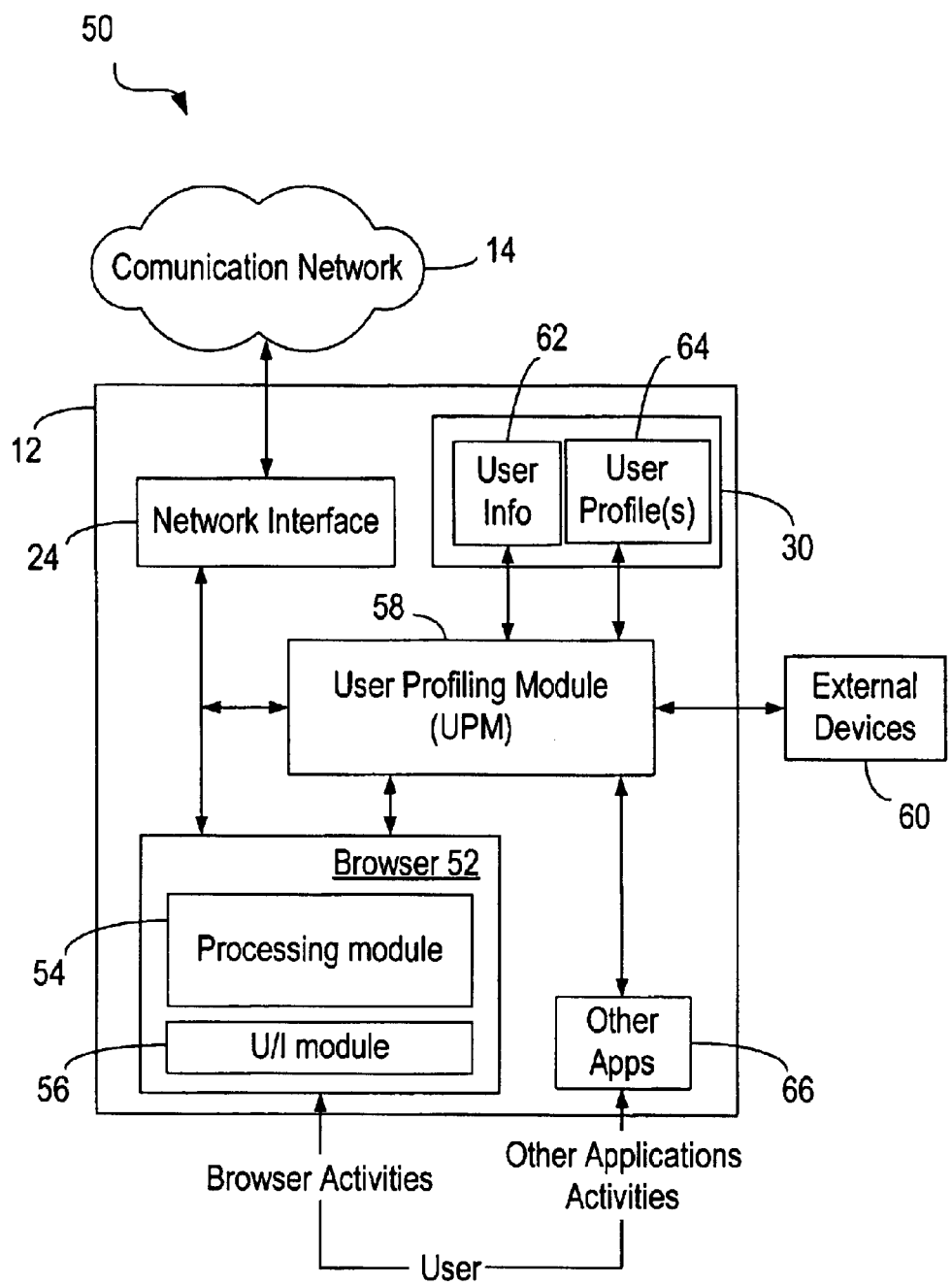
FIG. 3 is a simplified block diagram of a client computer system depicting the various modules responsible for creating user profiles according to an embodiment of the present invention.

FIG. 3 is a simplified block diagram of client computer system 12 depicting the various modules for creating user profiles according to an embodiment of the present invention. As shown, FIG. 3 depicts a browser 52 executing on client 12. As stated above, a browser is an example of a client program which allows users to access information in the form of web pages which may be stored on servers 16 connected to communication network 14. Examples of web browsers include the Microsoft® Internet Explorer browser provided by Microsoft® Corporation, and the Netscape® Navigator browser provided by Netscape® Corporation, and others.

Browser 52 generally includes a browser processing module 54 and a browser user interface module 56. Browser user interface module 56 provides an interface allowing the user to interact with browser 52 and to view web pages and other information displayed by browser 52. Processing module 54 receives information, such as URL information, input by the user via user interface 56, forms web page requests based on the information, and forwards the web page requests and other information to servers 16 coupled to communication network 14. Processing module 54 also processes information received in response to the user requests, and forwards the information to user interface module 56 for display to the user. Accordingly, web pages received by processing module 54 are displayed to the user using user interface module 56. Although browser 52 depicted in FIG. 3 comprises two modules, it should be apparent to one of ordinary skill in the art that several other modules which facilitate retrieval and display of web pages may also be included in browser 52.

According to the teachings of the present invention, a user profiling module (UPM) 58 executing on client computer 12 is responsible for generating personalized profiles for users. According to an embodiment of the present invention, UPM 58 builds user profiles by monitoring and collecting information on the users' activities. For a particular user, the user activities may include the user's interactions with browser 52, or interactions with other applications 66 executing on client system 12. Other applications 66 may include word processors, mail applications, graphics applications, database applications, and the like. Generally, other applications 66 may include any application which may be executed by client computer 12. The user activities monitored by UPM 58 may also include activities performed by the user on external devices 60 which are either coupled to client computer 12 or which are capable of exchanging information with client computer 12. Examples of external devices 60 include televisions, video cassette recorders (VCRs), audio systems, phone systems, pagers, and the like.

UPM 58 may also be configured to build user profiles based on information 62 stored in storage subsystem 30. Information 62 may also include information associated with profiles of other users, or even information associated with other profiles for the user. Information 62 may also include information received from other information sources. The user profiles built by UPM 58 are stored on client computer 12, usually in storage subsystem 30 from where they can be readily accessed by UPM 58 for editing and updating purposes.

Figure 4:
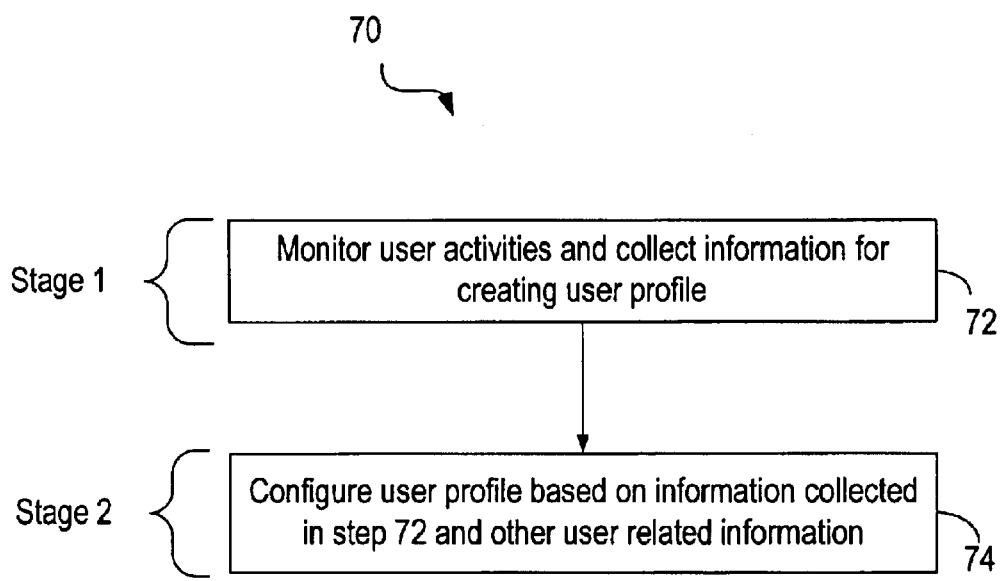
FIG. 4 is a simplified flowchart depicting the basic steps for creating personalized user profiles according to an embodiment of the present invention.

FIG. 4 depicts a simplified flowchart 70 depicting steps executed by UPM 58 for creating personalized user profiles according to an embodiment of the present invention. As shown in FIG. 4, the user profile creation process may broadly be performed in two stages. During the first stage (step 72), UPM 58 monitors user activities and collects information which may be used for creating a user profile. According to the teachings of the present invention, the user has complete control on the activities monitored by UPM 58 and on the information collected by UPM 58. The user can configure not only the activities to be monitored but also when the monitoring is to occur and the type of information to be collected by UPM 58. Accordingly, unlike conventional profiling systems where the user has very little control on the activities being monitored and the information being collected, UPM 58 monitors and collects only that information which is permitted to be collected by the user.

As previously described with regards to FIG. 3, the activities monitored by UPM 58 may include the user's interactions with browser 52, the user's interactions with other applications 66 executing on client computer 12, activities performed by the user on external devices 60 which are either coupled to client computer 12 or which are capable of exchanging information with client computer 12, and other like activities. According to the teachings of the present invention, UPM 58 collects both content information and context information for the monitored user activities. The content and context information recorded by UPM 58 may be stored on storage subsystem 30 and is used by UPM 58 to generate user profiles.

As discussed above, UPM 58 may be configured to monitor the user's interactions with browser 52 and to collect content and context information based on the user's browser usage. The interactions monitored by UPM 58 may include the user's web "surfing" activities, monitoring electronic commerce transactions conducted by the user, web searches performed by the user, financial transactions performed by the user using the browser, interactive activities such as participation in chat rooms and games in which the user participates, electronic mail related activities, and the like. It should be apparent that other user interactions may also be monitored in accordance with the teachings of the present invention.

Content information collected by UPM 58 may include contents of web pages accessed by the user which may include textual information, graphical information, audio/video information, and other types of information associated with web pages. The content information collected by UPM 58 may also include URL information associated with the web sites accessed by the user, information about searches or queries performed by the user using browser 52 which may include information about items searched, the results of the searches, and items selected by the user from the search results. The content information collected by UPM 58 may also include information on transactions, such as electronic commerce transactions, financial transactions, or the like, conducted by the user using the browser. The content information recorded by UPM 58 may also include information input by the user to browser 52 using input devices 28.

UPM 58 also records information related to the context in which the user performed the browser related activities. The context information recorded by UPM 58 with regards to a user's browser related activities may include information about the order in which the user accessed the various web pages (user's browser navigation), information regarding the user's response to interactive advertisements and solicitations, information about the length of time spent by the user on the web pages, information on the time when the user accessed the web pages, for example, day, time of day, etc., information related to web servers hosting the web pages accessed by the user, the user's frequency of accessing the web pages, and the like. In general, the content and context information collected/recorded by UPM 58 may include information on all aspects of the user's browser usage.

As previously stated, UPM 58 may also be configured to collect content and context information associated with the user interactions with other applications 66 executing on client computer 12. For example, UPM 58 may monitor and collect information on the user's interactions with an electronic mail (email) application, or a word processor application, a spreadsheet application, a database application, or any other application executing on client computer 12. The content and context information collected by UPM 58 will vary depending on the type of application. For example, for an email application the content information collected for each email may include the recipient information, sender information, email subject title information, and the information related to the contents of the email including attachments. Context information for an email application may include the time when the user receives emails, time when the user sends emails, subject matter of the emails, frequency of the emails, and the like. It should be apparent to one of ordinary skill in the art that other types of information related to an email application may also be recorded by UPM 58 according to the teachings of the present invention. Similarly, content and context information may be collected for the other applications.

UPM 58 may also be configured to monitor and collect content and context information related to the user's interaction with external devices 60 which are either coupled to client computer 12 or which are capable of exchanging information with client computer 12 via a communication link. As previously stated, examples of external devices 60 include televisions, VCRs, phones including cell phones, pagers, several consumer devices, and the like. The content and context information collected by UPM 58 will vary depending on the type of the external device. For example, for a television, the information recorded by UPM 58 may include information related to the channels viewed by the user, the amount of time that the user viewed the channels, the programs viewed by the user, and other television related information. For a VCR, the recorded information may include information on programs recorded by the user using the VCR, information on programs viewed by the user using the VCR, and the like. In a similar manner, content and context information may be collected for other external devices used by the user.

Referring back to FIG. 4, after information associated with the various user activities has been collected in step 72, during the second stage of the profile creation process, UPM 58 builds (or updates if the profile already exists) a personalized profile for the user based on the information collected in step 72. UPM 58 may also use other information, such as user related information stored in storage subsystem 30, to configure the profiles (step 74). Unlike conventional server-based user profiling techniques, according to the present invention, the user profile is constructed by UPM 58 which executes on client computer 12. Additionally, the resultant profile is also stored on client computer 12 and not on some remote server. As a result, the profile is not exposed to the outside world without explicit permission from the user, thus guaranteeing user privacy. This reduces the security concerns typically associated with conventional user-profiling techniques. Further details regarding step 74 are depicted in FIG. 5 and described below.

A user profile generated by UPM 58 is essentially a representation of the user's interests. The user profile generally comprises a set of concepts which are of interest to the user as determined from the content and context information collected by UPM 58. A value is generally associated with each concept quantifying the user's level of interest in the concept. The value associated with a particular concept is generally determined from evidence gathered for that particular concept from the content and context information collect by UPM 58.

Figure 5:
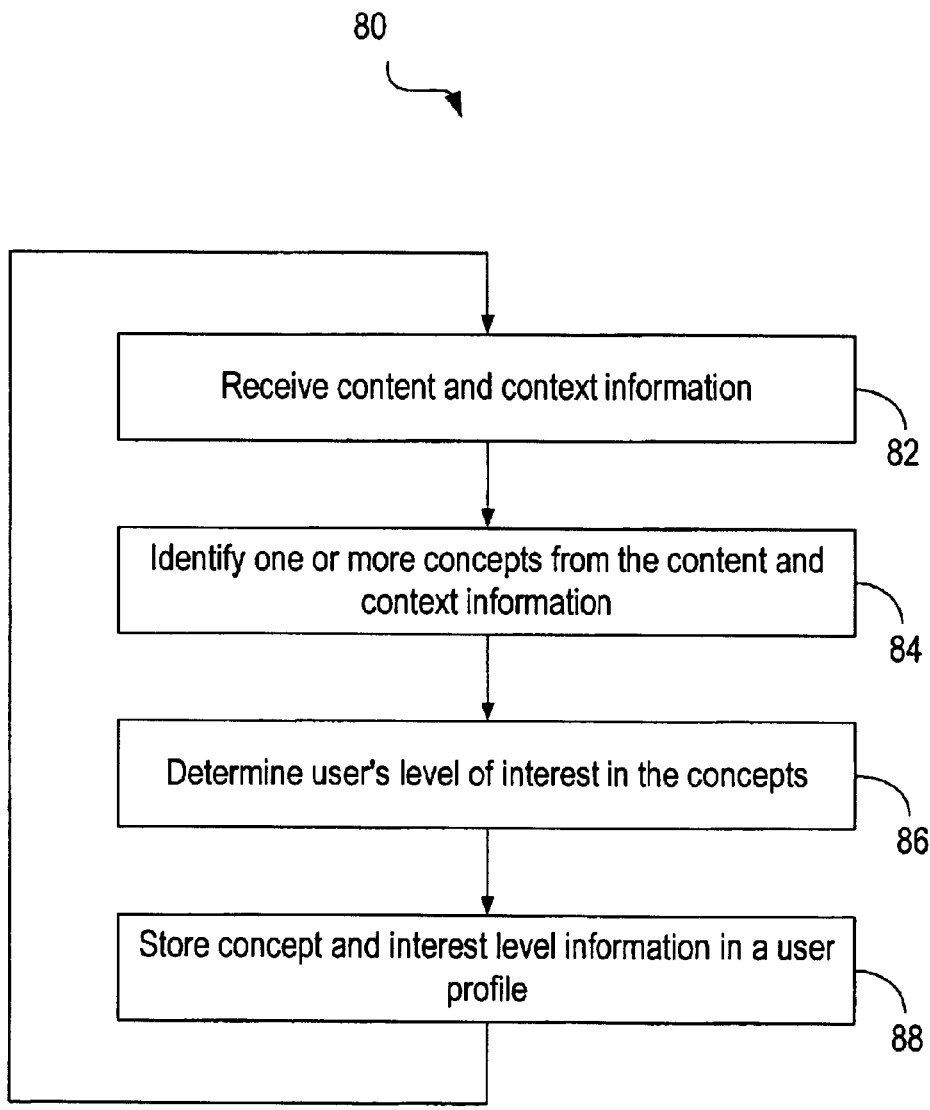
FIG. 5 is a simplified flowchart depicting steps performed by a client computer for creating/updating user profiles according to an embodiment of the present invention.

FIG. 5 depicts a simplified flowchart 80 showing steps performed by the present invention for building user profiles from the content and context information collected by UPM 58 in step 72 of flow chart 70 (see FIG. 4). Flow chart 80 is initiated when UPM 58 receives information, including context and content information, collected during step 72 depicted in FIG. 4 (step 82). UPM 58 then identifies one or more concepts from the content and context information (step 84). A variety of concepts may be included such as sports, business, politics, entertainment, and the like. Each of the concept may in turn have several sub-concepts. For example, sub-concepts under the "sports" concept may include baseball games, San Francisco 49ers games, National Hockey League (NHL) games, autobiographies by famous players, and the like. These sub-concepts are also identified by UPM 58 during step 84.

UPM 58 then determines the user's level of interest in the concepts (step 86). The user's level of interest in a concept may be quantified using a weight value assigned to the concept. Generally, a high weight value indicates a high level of user interest in the concept associated with the weight value. Accordingly, in step 86, UPM 58 processes the content and context information received in step 82 to determine weights to be assigned to the concepts identified in step 84 or previously identified concepts stored in the user profile. For newly identified concepts, UPM 58 calculates a weight value and associates the weight value with the concept. For previously determined concepts which are stored in the user profile, UPM 58 may increment or decrement the weights associated with the concepts. It should be apparent that other techniques for indicating a user's level of interest for the various concepts are also within the scope of the present invention.

The concept information and the associated weight information is then stored in a user profile for the corresponding user (step 88). Flow of control may then proceed back to step 82. A new user profile is generated if it does not already exist. Generally, a new user starts out with a blank profile which is then built based on the information collected for the user. Alternatively, the user may start out with a previously created profile or a profile template which is then updated based on information collected for the particular user. According to an embodiment of the present invention, the previously created profile may be a profile belonging to another user of the present invention. In this manner, a user may share or inherit profiles from other users. A user may also export sections of the user's profile to other users, allowing other users to share and inherit exported sections of the user profile. The client-personalized user profile may then be used by a variety of applications for providing user-customized and user-specific services to the user.

As described in flow charts 70 and 80 depicted in FIGS. 4 and 5 respectively, user profiles are created using a client computer without any server intervention. Accordingly, the user can control the activities monitored by the present invention, and also the information collected according to the teachings of the present invention. As a result, the present invention minimizes the security concerns typically associated with conventional profiling systems.

Figure 6:
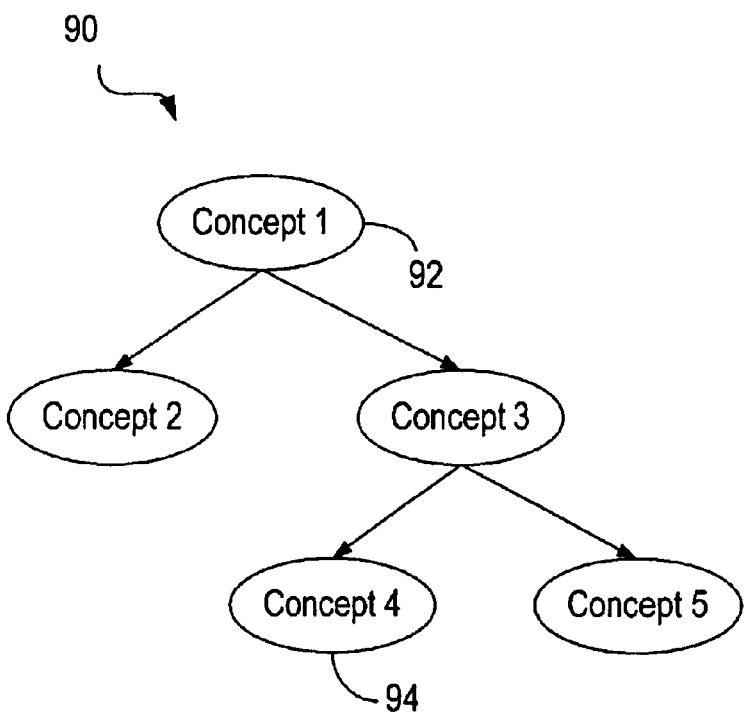
FIG. 6 depicts a hierarchical tree format for storing/representing a user profile according to an embodiment of the present invention.

In one embodiment of the present invention, a hierarchical format such as tree structure 90 depicted in FIG. 6 may be used to store/represent a user profile. In this format, each node 92 of tree 90 may represent a concept of interest to the user. Weights may be associated with each node indicating the user's level of interest in that particular concept (or node). Accordingly, if a weight associated with node 92 is higher than a weight associated with node 94, then it may imply that the user is more interested in the concept represented by node 92 than in the concept represented by node 94. These weights are automatically updated by UPM 58 based on user's activities and the content and context information gathered from the user's activities and other information sources. For example, if a user repeatedly accesses a sports related web page, then this may indicate a heightened interest in sports, and accordingly a weight associated with a "sports" concept node may be incremented. Alternatively, if the user fails over time to access a web page related to sports, this may indicate a decreased (or decreasing) interest in sports, and accordingly the weight associated with the sports concept node may be decremented. Accordingly, weights associated with the various concepts may be decremented or decayed over time to indicate waning user interest. A user profile thus reflects a user's present interest level in the various concepts. In general, a user profile is regularly updated by UPM 58 and dynamically changes over time to reflect the user's changing interests.

In alternate embodiments of the present invention, the nodes in tree 90 may be sorted based upon the weights associated with the nodes. For example, nodes containing concepts in which the user exhibits a high level of interest may be located closer to the root level of the tree while concepts of lesser interest to the user may be located closer to the leaf level of the tree. Accordingly, tree 90 as depicted in FIG. 6 may indicate that the user has a higher level of interest in "Concept 2" than in "Concept 4." It should be apparent to one of ordinary skill in the art, that the user profile format depicted in FIG. 6 is merely illustrative of an embodiment of the present invention. Alternate embodiments of the present invention may use other formats known in the art to store/represent user profiles.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. In one embodiment, the present invention is incorporated in products and services offered by PurpleYogi.com, Inc. located in Mountain View, Calif.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a networked computer environment, a method for generating a personalized profile for a user on a client computer, the method comprising:
    monitoring user activities at the client computer, the user activities including user interactions with a browser program executing on the client computer;
    collecting user information based on the monitored user activities, the user information including content information and context information;
    generating, on the client computer, the personalized profile for the user by processing the user information; and
    storing the personalized profile on the client computer, wherein the personalized profile can be accessed only if permitted by the user,
    wherein by generating the personalized profile on the client computer and by storing the personalized profile on the client computer, the personalized profile is generated without distribution of the personalized profile to a computer other than the client computer.

2. The method of claim 1 wherein generating the personalized profile for the user comprises:
    accessing a pre-existing user profile; and
    generating the personalized profile for the user by updating the pre-existing user profile based on the user information.

3. The method of claim 2 wherein the pre-existing user profile is generated using a second client computer.

4. The method of claim 1 wherein:
    monitoring the user activities comprises receiving permission from the user to monitor the user activities; and
    collecting user information comprises receiving permission from the user to collect the user information.

5. The method of claim 1 wherein the monitoring and collecting is performed only if authorized by the user.

6. The method of claim 1 wherein the user interactions with the browser program include activities selectable from a group of activities including web browsing activities, search activities using the browser program, electronic commerce transaction activities, electronic mails related activities, financial activities performed by the user using the browser program, and interactive activities performed by the user using the browser program.

7. The method of claim 1 wherein the content information is selectable from information comprising contents of web pages accessed by the user using the browser, URN information for the web pages accessed by the user, title information of the web pages accessed by the user, information on searches performed by the user using the browser program, information on transactions performed by the user using the browser program, information input by the user to the browser program, links on the web pages accessed by the user to other web pages.

8. The method of claim 1 wherein the context information is selectable from information comprising information on time when the user performed the user interactions with the browser program, information related to time when the user accessed web pages via the browser program, information related to amount of time spent by the user viewing the web pages accessed via the browser program, information on servers hosting the web pages accessed by the user, and information regarding order in which the user accessed the web pages.

9. The method of claim 1 wherein generating the personalized profile for the user comprises:
    determining at least one concept from the user information;
    determining a value for the at least one concept from the user information, the value indicating the user's level of interest in the at least one concept; and
    generating the personalized profile for the user including the at least one concept and the value determined for the at least one concept.

10. The method of claim 1 further comprising exporting sections of the personalized profile for the user to other users.

11. The method of claim 1 wherein the user activities include user interactions with client applications executing on the client computer, the client applications selectable from a group of applications comprising word processing application, mail application, information processing application, database application, and spreadsheet application.

12. The method of claim 1 wherein the user activities include activities performed by the user on an external device, the external device selectable from a group of devices comprising a phone, a television, a video cassette recorder, a pager, and a communication device.

13. The method of claim 1 wherein the personalized profile for the user is represented in a hierarchical format.

14. In a distributed computing environment including at least one client system and a server system, the server system storing a plurality of resources, a method for generating a personalized profile for a user on the client computer, the method comprising:
    monitoring user activities at the client computer, the user activities including activities for accessing a resource from the plurality of resources stored by the server system;
    collecting user information based on the monitored user activities at the client computer, the user information including content information and context information;

generating, on the client computer, the personalized profile for the user based upon the user information; and storing the personalized profile on the client computer, wherein the personalized profile can be accessed only if permitted by the user, wherein by generating the personalized profile on the client computer and by storing the personalized profile on the client computer, the personalized profile is generated without distribution of the personalized profile to a computer other than the client computer.

15. The method of claim 14 wherein:

monitoring the user activities comprises receiving permission from the user to monitor the user activities; and collecting user information comprises receiving permission from the user to collect the user information.

16. The method of claim 14 wherein generating the personalized profile for the user comprises:

determining at least one concept from the user information;

determining a value for the at least one concept from the user information, the value indicating the user's level of interest in the at least one concept; and generating the personalized profile for the user including the at least one concept and the value determined for the at least one concept.

17. A method for building a user profile on a client computer, the method comprising:

determining content information for user interactions with the client computer;

determining context information for the user interactions;

determining concepts information from the content and context information;

determining user interest level information for the concepts information;

building the user profile based on the concepts and user interest level information; and storing the user profile on the client computer, wherein the personalized profile can be accessed only if permitted by the user, wherein by building the user profile on the client computer and by storing the user profile on the client computer, the user profile is built without distribution of the user profile to a computer other than the client computer.

* * * * *